United States Patent [19] [11] 4,443,814
Mori et al. [45] Apr. 17, 1984

[54] REAR PROJECTION APPARATUS

[75] Inventors: Leo Mori, Yokohama; Takashi Aoba, Ageo; Mamoru Tominaga, Yokohama, all of Japan

[73] Assignee: Tokyo Shibaura Denki Kabushiki Kaisha, Kawasaki, Japan

[21] Appl. No.: 311,399

[22] Filed: Oct. 14, 1981

[30] Foreign Application Priority Data

Nov. 10, 1980 [JP] Japan ................... 55-157891

[51] Int. Cl.³ .................. H04N 9/31; G03B 21/60
[52] U.S. Cl. ............................. 358/60; 358/231; 350/127; 350/128
[58] Field of Search ............. 358/60, 61, 231, 232, 358/238, 237, 55, 92; 350/127, 128, 117, 129, 122

[56] References Cited

U.S. PATENT DOCUMENTS

| 2,480,031 | 8/1949 | Kellogg | 350/127 |
| 2,738,706 | 3/1956 | Thompson, Jr. | 358/231 |
| 3,166,635 | 1/1965 | Todt | 358/60 |
| 3,623,717 | 8/1970 | Glenn | 350/128 |
| 4,026,634 | 3/1977 | Fukushima | 350/128 |
| 4,054,907 | 10/1977 | Itoh | 358/60 |

FOREIGN PATENT DOCUMENTS

| 908098 | 2/1954 | Fed. Rep. of Germany | 350/128 |
| 46-36249 | 5/1971 | Japan. | |
| 51-100723 | 9/1976 | Japan. | |

Primary Examiner—Tommy P. Chin
Attorney, Agent, or Firm—Cushman, Darby & Cushman

[57] ABSTRACT

A rear projection apparatus for producing an optical image on a surface of a rear transmitting screen in which a convex lens array is formed on both surfaces of the screen, each convex lens formed on one surface of the screen having a corresponding convex lens formed on the other surface of the screen with a common optical axis, the focal point of each convex lens formed on one surface of the screen being on the surface of the each convex lens formed on the to other surface of the screen.

9 Claims, 17 Drawing Figures

REAR PROJECTION APPARATUS

BACKGROUND OF THE INVENTION

This invention relates to rear projection apparatus, and more particularly to color image reproducing apparatus of the projection type in which images of different colors are projected onto a viewing screen in a superimposed manner to form the composite multicolor image seen by the viewer.

One known rear projection apparatus includes a rear transmitting screen and a projector for projecting an optical image onto a surface of the screen to view the image which appears on the opposite surface of the screen. The projector projects an image of a monochromic light or a plurality of images of monochromic or different color lights onto the screen to form a composite image on the screen. Particularly, in such color image reproducing apparatus, the projector includes a color television receiver and three small cathode-ray tubes having phosphor screens for individually forming red, green and blue component images. These component images are then optically projected onto the screen in a superimposed manner to form the desired multicolor image.

The quality of the image projected on the screen depends on the quality of the screen. Therefore, various screens have been developed. One well-known screen, which is called the "lenticular screen", includes a plurality of half column lenses arranged in parallel on a surface of a transparent plate.

Such lenticular screen, however, has low luminance at the circumference of the screen and color shift of the image according to the position of the viewer with respect to the screen as shown FIGS. 1 and 2.

In FIG. 1 image lights R, G and B are projected along the individual paths onto the convex surface SF of a screen S. These image lights pass through screen S and then emerge from the plane surface SB of screen S and pass along the different directions. This causes a difference in the color of the image between viewing the image as seen at the region K and viewing at the region L.

Further, when light is projected onto screen S, the intensity distribution of transmitted light is shown in FIG. 2. The light components in the projected direction do not have uniform intensity and the luminance on the plane surface of the screen. As a result, prior art devices employing lenticular screens have failed to reproduce good images.

Another type of known screen includes a plurality of half column lens arranged in parallel on both surface of a transparent plate as described in Japanese Patent Disclosure No. 100723/76. This type of screen may improve the luminance and color shift in either the horizontal or vertical direction of the screen, but may not improve the luminance and color shift in both directions. Therefore, such screen is not a satisfactory rear transmitting screen.

SUMMARY OF THE INVENTION

It is an object of this invention to provide a rear projection apparatus to achieve high luminance and uniformity of luminance of the image.

It is another object of this invention to provide a rear projection apparatus to achieve excellent color balance of the image uniformly throughout the screen.

It is yet another object of this invention to provide a rear projection apparatus to expand the area of view.

In accordance with the preferred embodiment of this invention a rear transmitting screen includes a convex lens array formed on both surfaces thereof. Each convex lens formed on one surface of the screen and a corresponding convex lens formed on the other surface of the screen define a common optical axis. Further the focal point of each convex lens formed on one surface of the screen coincides with the surface of the corresponding convex lens formed on the other surface of the screen. A high quality optical image is thus produced by such rear transmitting screen.

BRIEF DESCRIPTION OF THE DRAWINGS

Other objects and advantages of this invention will become more apparent and more readily appreciated from the following detailed description of the present preferred exemplary embodiments of the invention taken in conjunction with the accompanying drawings, in which.

DESCRIPTION OF THE PREFERRED EMBODIMENTS

Figure 1:
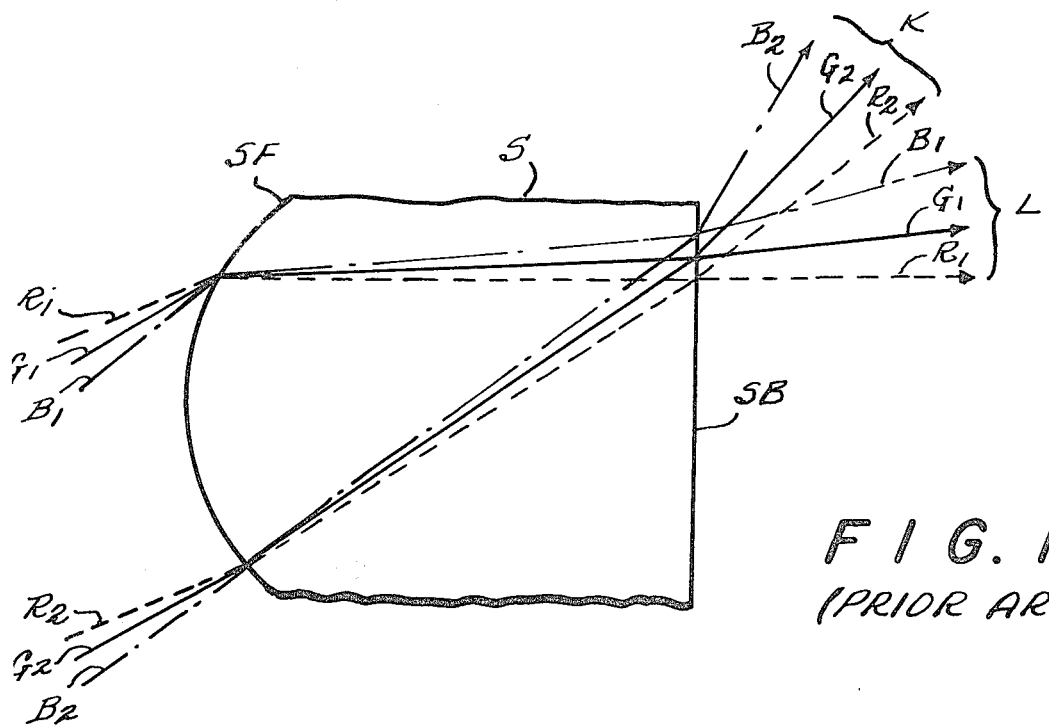
FIGS. 1 and 2 show partial sectional views of a prior art rear transmitting screen and paths of light projected thereon.
Figure 2:
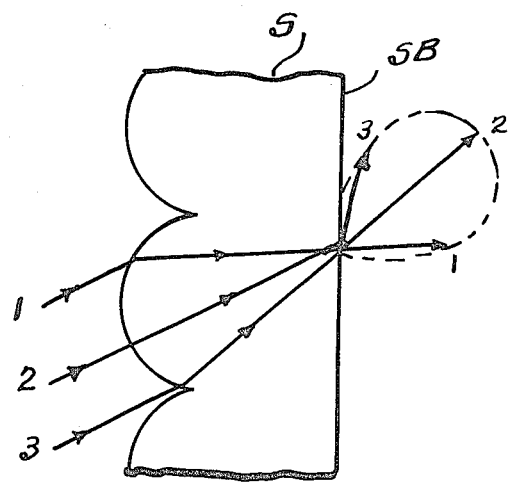
Figure 3:
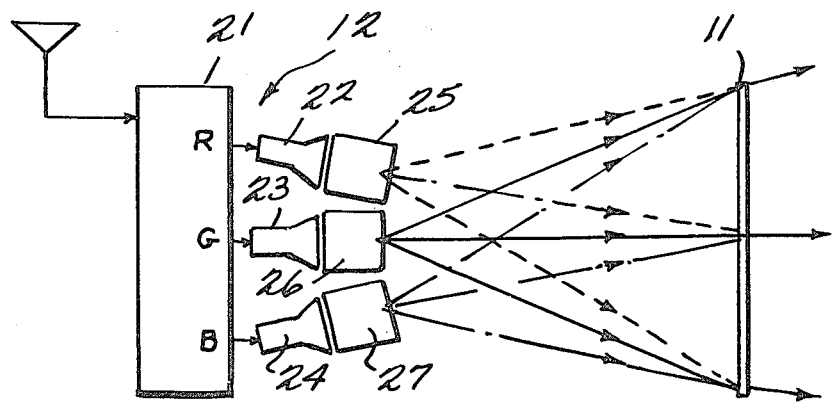
FIG. 3 is a schematic view of a preferred embodiment of the present invention.

Referring to FIG. 3, one embodiment of the present invention includes a rear transmitting screen 11 and a projector 12 for projecting images onto rear transmitting screen 11.

Projector 12 includes a color television receiver 21 for receiving a color video signal and separating it into red, green and blue components, and three cathode-ray tubes 22, 23 and 24 having phosphor screens for individually forming red, green and blue component images. Cathode-ray tubes 22, 23 and 24 are placed in a row facing rear transmitting screen 11.

The light from cathode-ray tubes 22, 23 and 24 is projected onto rear transmitting screen 11 through projection lenses 25, 26 and 27, respectively.

Figure 4:
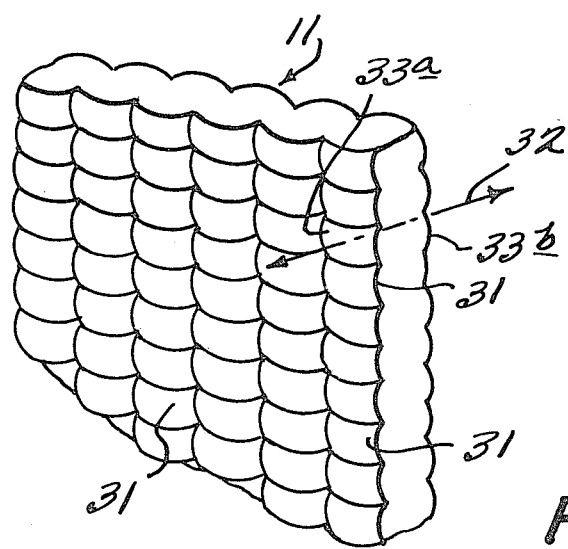
FIG. 4 is a perspective view of the rear transmitting screen shown in FIG. 3.

Rear transmitting screen 11, which is made of a transparent glass or a transparent resin such as a acrylic resin, vinyle chloride, polycarbonate or polystyrene, includes a large number of minute convex lenses 31 having curved surfaces on both surfaces thereof as shown in FIG. 4. These convex lenses 31 correspond to the picture elements of the image. Therefore, preferably more than five hundred convex lenses 31 are arranged in the longitudinal and transverse directions. A convex lens 33a formed on one surface of screen 11 corresponds to a convex lens 33b formed on the opposite surface of screen 11. These convex lenses 33a and 33b have a common optical axis 32. The focal point of convex lens 33a is on the surface of convex lens 33b, and vice versa. Namely, the distance d between the surfaces of convex lenses 33a and 33b is equal to the focal length of convex lenses 33a and 33b. Therefore, if convex lenses 33a and 33b are made of acrylic resin having the refractive index of 1.49 and have spherical surfaces with radius R, the distance d between their surfaces is preferably 2.5R to 3.0R. The other convex lenses 31 on rear transmitting screen 11 are formed as convex lenses 33a and 33b. Further the edges of each convex with its neighbors form a rectangle as can be seen in FIG. 4.

Figure 5:
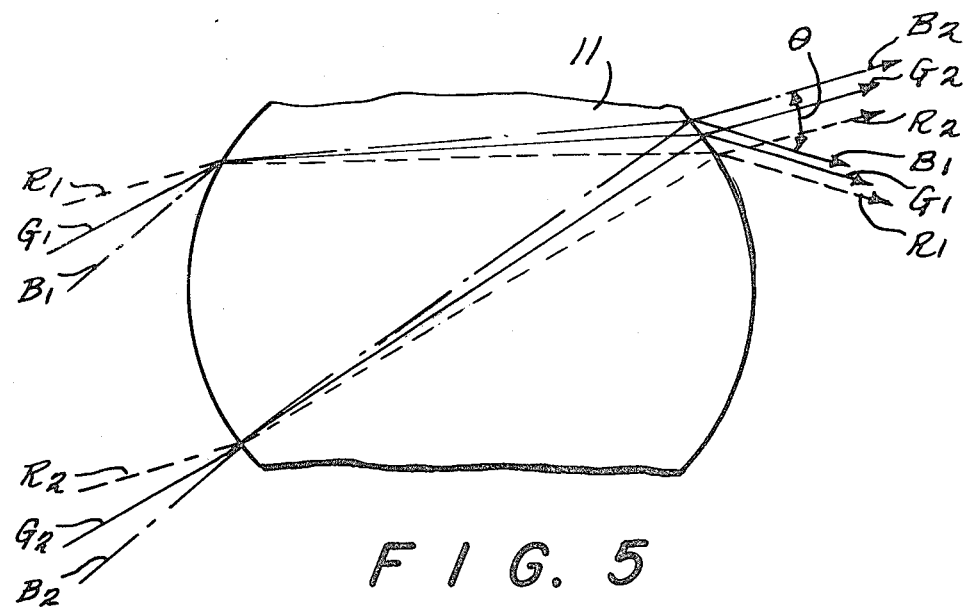
FIGS. 5 to 7B show paths of lights projected onto the rear transmitting screen shown in FIG. 4.
Figure 7B:
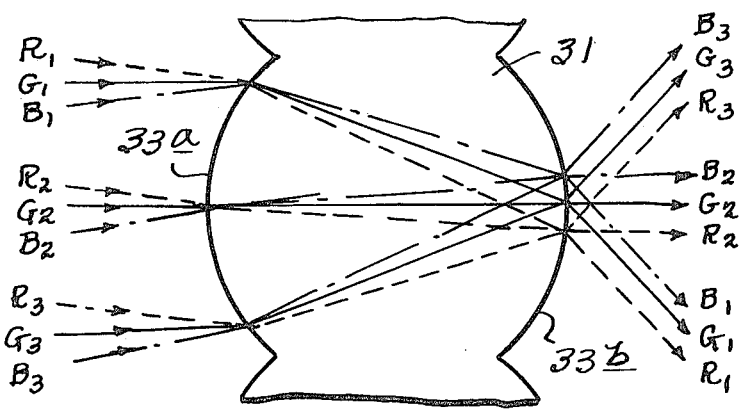
Figure 7A:
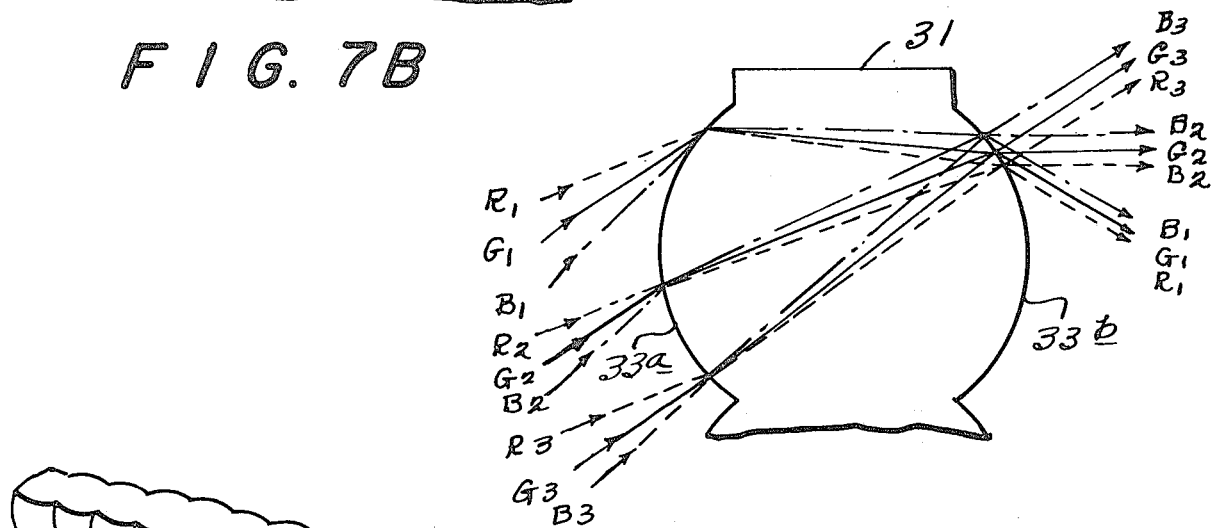

In operation, color television receiver 21 receives a color video signal and separates it into red, green and blue component signals. The thus separated signals are delivered to cathode-ray tubes 22, 23 and 24, respectively. Cathode-ray tubes 22, 23 and 24 individually form red, green and blue component images. These images R, G and B project onto rear transmitting screen 11 through projection lenses 25, 26 and 27, respectively. At the surface of screen 11 these images R, G and B refract and pass through screen 11, and then emerge from screen 11 as shown in FIG. 5. Since the focal point of convex lens 33a is on the surface of convex lens 33b, and also the focal point of convex lens 33b is on the surface of convex lens 33a, the lights R, G and B projected from different angles emerge from screen 11 with a constant spread angle $\theta$ centered around a direction parallel to the optical axis of convex lens 31, that is, the vertical direction to screen 11, respectively. Accordingly, the lights R, G and B emerging from screen 11 are parallel to one another within the above-mentioned spread angle. The relationships are found with all convex lenses 31 on screen 11. FIG. 7A shows the light paths through a convex lens 31 away from the center of screen 11. FIG. 7B shows the light paths through a convex lens 31 at the center of screen 11.

As described above, the rear projection apparatus of this invention transmits the light of different color so as to emerge from screen 11 with the same spread angle centering around a direction parallel to the optical axis of convex lens 31, even if the light is projected from different angles onto screen 11. Therefore, the light beams emerging from screen 11 are parallel to one another and as a result, an image having uniform color balance may be seen from any viewpoint.

Figure 6:
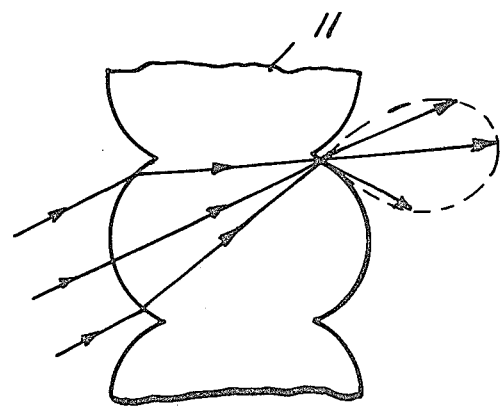

The rear projection apparatus of this invention also transmits light of different colors so as to emerge from screen 11 with the same spread angle centering around the vertical direction to screen 11. Therefore, the intensity of light is highest in the vertical direction of screen 11 at any point of screen 11 as shown in FIG. 6. As a result, the light projected onto screen 11 is effectively refracted toward the viewer. Accordingly, the light is used effectively and an image having high and uniform luminance is obtained.

Further, the spread angle of the light which emerges from screen 11 may be made different between the longitudinal and transverse directions of screen 11. For example, the refractive index of the convex lens 31 of screen 11 is 0.49, the pitch Ph of lens 31 in the transverse direction is 1.6R (R is radius of the convex lens) and the pitch Ph of lens 31 in the longitudinal direction is 0.8R. The light then has a spread angle of ±30° in the traverse direction and ±13° in the longitudinal direction.

Figure 8:
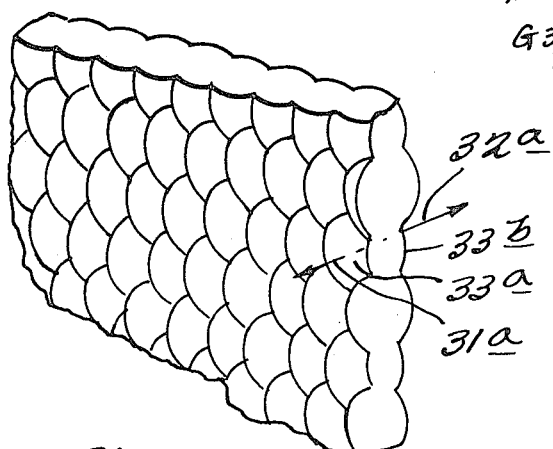
FIG. 8 is a perspective view of a modification of the rear transmitting screen using in the present invention.

FIG. 8 illustrates a modification of the rear transmitting screen of FIG. 4. This modification is similar to screen 11 illustrated in FIG. 4 except the edges joining each convex lens 31 to its neighbors form a hexagon. Such rear transmitting screen 11 causes the light to emerge with the transverse spread angle equal to the longitudinal spread angle.

Figure 9A:
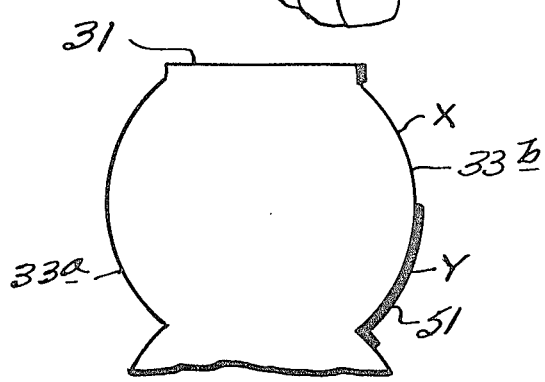
FIGS. 9A, 9B, 10A and 10B are partial sectional views of another modification of the rear transmitting screen using in the present invention.
Figure 9B:
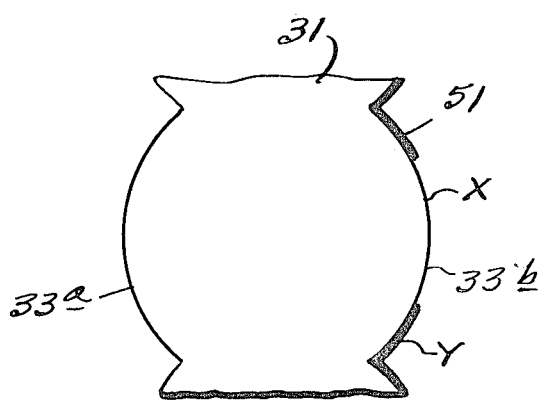

FIGS. 9A and 9B illustrate a part of another modification of the rear transmitting screen of FIG. 4. In this modification, the surface of convex lens 33b from which the light emerges is covered with a shield material 51 except for the portion X passing light.

Since portion X is different according to the location of convex lens 31 on screen 11, the shielded portion is also different according to the location of convex lens 31 on screen 11 as shown in FIGS. 9A and 9B. Convex lens 31 shown in FIG. 9A is located at the circumference of screen 11. Convex lens 31 shown in FIG. 9B is located at the center of screen 11.

Shield material 51 reduces the passage of stray light and the reflection of external light. As a result, this modification of the rear transmitting screen produces an image having higher contrast in a well lit room as well as in a dark room.

Figure 10A:
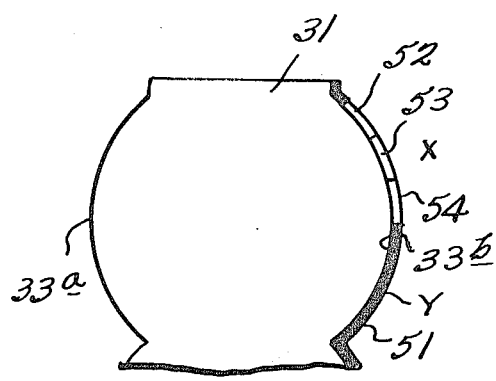
Figure 10B:
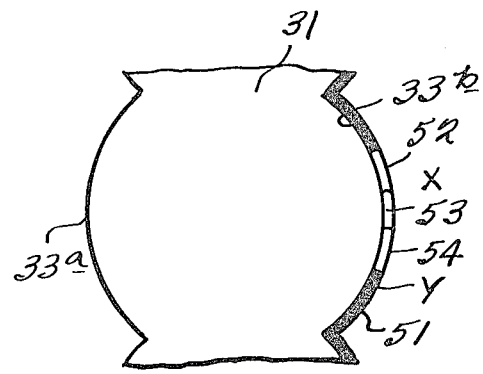

Further, for the light passing portion X of the convex lens 31, a red filter 52, a green filter 53 and a blue filter 54 may be arranged and coated as shown in FIGS. 10A and 10B. Such a rear transmitting screen with color filters reduces even more the influence of external light and produces a better color image even in a well lit room.

Some light diffusion may be desirable on the surface of the light passing portion X of convex lens, particularly in the embodiments of FIGS. 9A and 9B. Also, in FIGS. 4 and 8, some light diffusion may be desirable on the surface of convex lens 31 from which the light emerges. Such light diffusion causes spread of the visible range of the image. Accordingly, rear transmitting screen 11 may be made of a material having a slightly light diffusion characteristic as well as an absolutely transparent material.

Figure 11A:
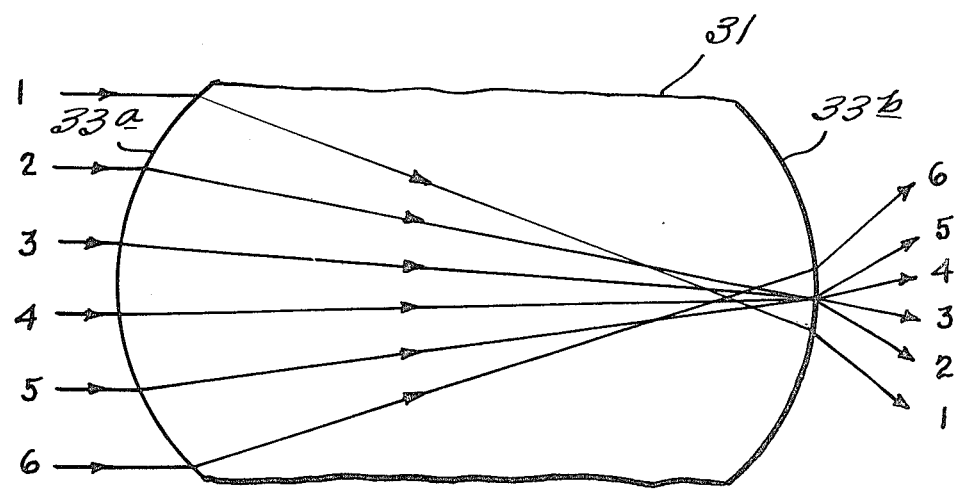
FIGS. 11A to 11D show the relationship between the features of the surface of the rear transmitting screen and the paths of lights projected thereon.

Further, convex lenses 33a and 33b formed on the both surfaces of screen 11 may have different features from each other. If convex lenses 33a and 33b have the same spherical surfaces as shown in FIG. 11A, a part of the incident light beams 1 to 6, for example, the incident light beams 1 and 6 emerge from convex lens 33b out of the desirable spread angle. This disadvantage can be overcome by using convex lenses 33a and 33b having different features from each other as shown in FIGS. 11B to 11D.

Figure 11B:
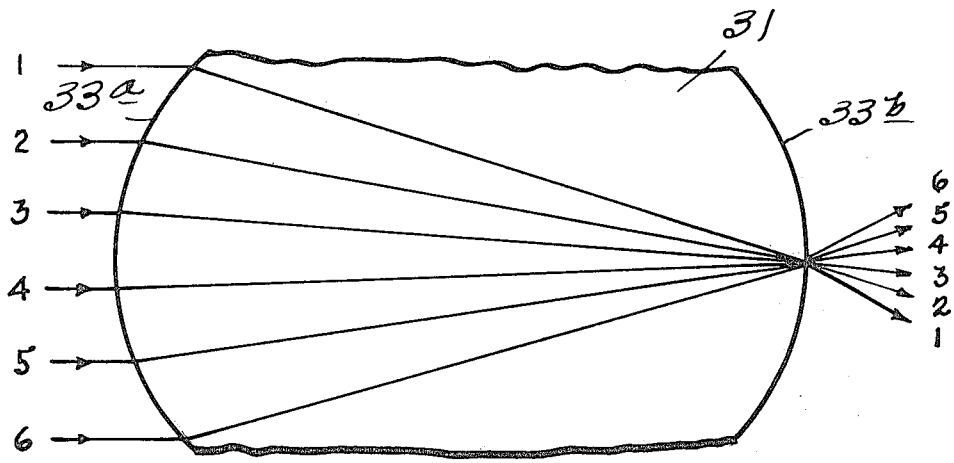

In FIG. 11B, convex lens 33a has a spherical surface having a radius R and convex lens 33b has a spherical surface having a radius r (not equal to R). If convex lenses 33a and 33b have a refractive index 1.49 and thickness d, the relationship among R, r and d is preferably determined according to the following equations:

$$2.0R < d < 4.0R,\ 0.8R < r < 1.2R$$

Figure 11C:
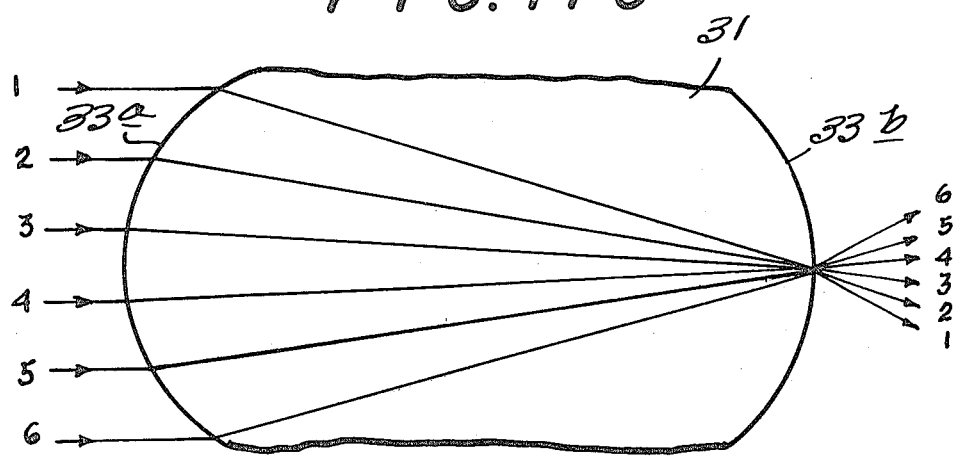
Figure 11D:
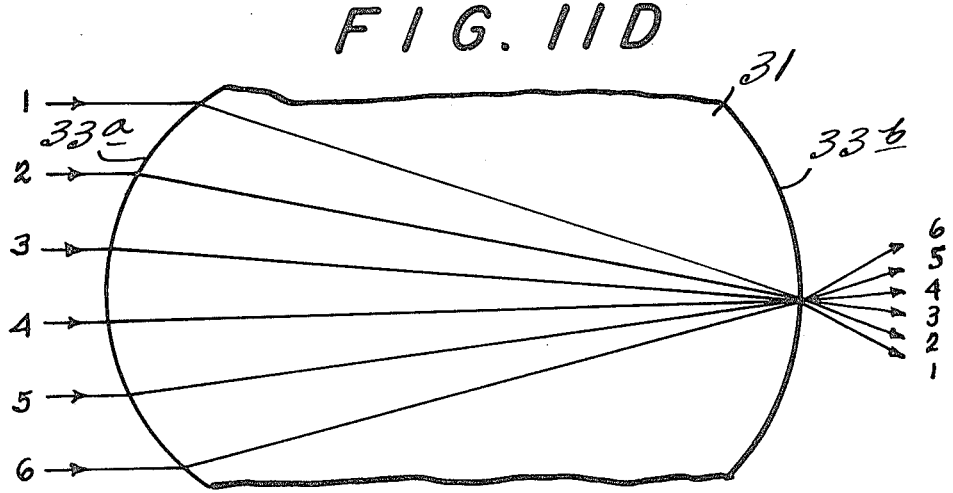

In FIG. 11C, convex lens 33a has an ellipsoidal surface having a long radius A and a short radius B. Convex lens 33b has an ellipsoidal surface having a long radius a and a short radius b. If convex lenses 33a and 33b have a refractive index 1.69 and thickness d, the relationship among A, B, a, b and d is preferably determined according to the following equations:

$$1.0A < d < 3.0A,\ 0.8B/A < b/a < 1.2B/A$$

In FIG. 11D, convex lens 33a has an ellipsoidal surface having a long radius A and a short radius B, while convex lens 33b has a spherical surface having a radius r. If convex lenses 33a and 33b have a refractive index 1.69 and thickness d, the relationship among A, B, r and d is preferably determined according to the following equations:

$$1.0A < d < 3.0A, \quad 0.25d < r < 0.5d$$

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. A rear projection apparatus comprising:
   a rear transmitting screen including a convex lens array formed on both surfaces thereof, each said convex lens having spherical surface formed on one surface of said screen having a corresponding spherical convex lens formed on the other surface of said screen with a common optical axis, the focal point of said each convex lens formed on one surface of said screen being on the surface of the corresponding convex lens formed on the other surface of said screen, the surfaces of said convex lenses from which light emerges are shielded to block light except in light passing portions corresponding to said focal point of said each corresponding convex lens, and said surfaces of said convex lenses from which light emerges corresponding to said light passing portions are separated into a plurality of colored regions to pass light having specific wave length; and
   a projector for projecting an optical image onto a surface of said screen.

2. A rear projection apparatus according to claim 1, wherein edges joining each of said convex lens to its neighbors form a hexagon.

3. A rear projection apparatus according to claim 1, wherein the surface of said light passing portions of said convex lenses diffuse light.

4. A rear projection apparatus according to claim 1, wherein said projector includes three color projectors for individually projecting red, green and blue image components.

5. A rear projection apparatus according to claim 1, further comprising a lens system for enlarging the image from said projector and projecting the enlarged image onto said rear transmitting screen.

6. A rear projection apparatus according to claim 1, wherein said color projectors each are cathode ray tubes.

7. A rear projection apparatus according to claim 1, further comprising a color television receiver for receiving a color video signal and separating it into red, green and blue components.

8. A rear projection apparatus according to claim 1, wherein said convex lenses each have ellipsoidal surfaces.

9. A rear projection apparatus according to claim 1, wherein the edges joining each said convex lens to its neighbors form a rectangle.

* * * * *